(12) United States Patent
Krage et al.

(10) Patent No.: US 11,759,883 B2
(45) Date of Patent: Sep. 19, 2023

(54) INSERTS TO ENABLE FRICTION STIR WELDING JOINTS AND METHODS OF FORMING FRICTION STIR WELDED ASSEMBLIES

(71) Applicant: Ford Global Technologies, LLC, Dearborn, MI (US)

(72) Inventors: Harvey Krage, Ypsilanti, MI (US); Gerald J. Heath, Allen Park, MI (US); David Anthony Wagner, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 718 days.

(21) Appl. No.: 16/749,229

(22) Filed: Jan. 22, 2020

(65) Prior Publication Data
US 2021/0220941 A1    Jul. 22, 2021

(51) Int. Cl.
*B23K 20/12* (2006.01)
*F16B 7/00* (2006.01)
*F16B 5/08* (2006.01)
*B23K 103/10* (2006.01)

(52) U.S. Cl.
CPC .............. *B23K 20/128* (2013.01); *F16B 5/08* (2013.01); *B23K 2103/10* (2018.08)

(58) Field of Classification Search
CPC ..... B23K 9/0203; B23K 26/26; B23K 20/128
See application file for complete search history.

(56) References Cited

U.S. PATENT DOCUMENTS

| 8,590,767 B2 | 11/2013 | Chun et al. |
| 2008/0096038 A1 | 4/2008 | Nagano |
| 2014/0004375 A1* | 1/2014 | Yamauchi ................. C22C 1/02 428/615 |

FOREIGN PATENT DOCUMENTS

| JP | 11226759 A * | 8/1999 | ........... B23K 20/124 |
| JP | 4774251 | 9/2011 | |
| JP | 6287751 | 3/2018 | |

OTHER PUBLICATIONS

English Translation of JP 11-226759 from EPO dated Jul. 6, 2022 (Year: 2022).*

* cited by examiner

*Primary Examiner* — Adam Krupicka
(74) *Attorney, Agent, or Firm* — Burris Law, PLLC

(57) ABSTRACT

A friction stir welded assembly includes a first workpiece having an interior portion with opposed interior walls, a second workpiece having an interior portion with opposed interior walls, and an insert positioned within the interior portion of the first workpiece and the interior portion of the second workpiece. The insert extends between and abuts at least one of the opposed interior walls of the first workpiece and the opposed interior walls of the second workpiece and a friction stir weld is between the first workpiece to the second workpiece. A joining end of the first workpiece and a joining end of the second workpiece form a butt joint or a lap joint between the first and second workpieces, and the friction stir weld is a butt weld or a lap weld, respectively, between the first and second workpieces.

13 Claims, 6 Drawing Sheets

INSERTS TO ENABLE FRICTION STIR WELDING JOINTS AND METHODS OF FORMING FRICTION STIR WELDED ASSEMBLIES

FIELD

The present disclosure relates to friction stir welding and friction stir welded assemblies.

BACKGROUND

The statements in this section merely provide background information related to the present disclosure and may not constitute prior art.

Friction stir welding (FSW) is a solid state joining process that uses frictional heat generated by a rotating tool to soften and intermix the metal in both parts to form a bond or weld between two workpieces. The rotating tool is inserted into a workpiece or at an interface between two workpieces and high contact loads between the rotating tool and the workpiece(s) are needed to provide quality robust friction stir welds. However, joining of closed cell structures can result in joints that do not have adequate support for quality robust FSW of the structures.

The present disclosure addresses the issue related to FSW of closed cell structures, among other issues related to FSW.

SUMMARY

In one form of the present disclosure, a friction stir welded assembly includes a first workpiece having an interior portion with opposed interior walls, a second workpiece having an interior portion with opposed interior walls, and an insert positioned within the interior portion of the first workpiece and the interior portion of the second workpiece. The insert extends between and abuts at least one of the opposed interior walls of the first workpiece and the opposed interior walls of the second workpiece and a friction stir weld is between the first workpiece to the second workpiece. In some variations the friction stir weld joins the insert to the first workpiece and the second workpiece.

In at least one variation the friction stir welded assembly includes a joining end of the first workpiece and a joining end of the second workpiece forming a butt joint, and the friction stir weld is a butt weld between the first workpiece and the second workpiece. In such variations the insert abuts the opposed interior walls of the first workpiece and the opposed interior walls of the second workpiece. Also, in some variations the insert has a tab extending between the butt joint formed by the joining end of the first workpiece and the joining end of the second workpiece. In at least one variation the tab is incorporated in the butt weld.

In other variations, the friction stir welded assembly includes a joining end of the first workpiece positioned within the interior portion of the second workpiece such that a lap joint is formed between the first workpiece and the second workpiece. In such variations the friction stir weld is a lap weld between the first workpiece and the second workpiece and the insert abuts the opposed interior walls of the first workpiece. Also, in some variations the insert has a tab extending between the lap joint formed between the first workpiece and the second workpiece. In at least one variation the tab is incorporated in the lap weld.

In some variations the insert is a solid insert extending between and abutting at least one of the opposed interior walls of the first workpiece and the opposed interior walls of the second workpiece. In other variations, the insert has interior cavities between surfaces abutting at least one of the opposed interior walls of the first workpiece and the opposed interior walls of the second workpiece.

In at least one variation the first workpiece is cast aluminum workpiece and the second workpiece is a wrought aluminum workpiece. In such a variation the wrought aluminum workpiece can be an extruded aluminum workpiece and/or the insert is an aluminum insert.

In another form of the present disclosure, a friction stir welded assembly includes a first workpiece having an interior portion with opposed interior walls and a joining end, a second workpiece having an interior portion with opposed interior walls and a joining end, and an insert positioned within the interior portion of the first workpiece and the interior portion of the second workpiece. The insert extends between and abuts at least one of the opposed interior walls of the first workpiece and the opposed interior walls of the second workpiece, and a friction stir weld is between the first workpiece and the second workpiece such that the friction stir weld bonds the first workpiece, the second workpiece and the insert together.

In some variations the joining end of the first workpiece and the joining end of the second workpiece form a butt joint, the insert abuts the opposed interior walls of the first workpiece and the opposed interior walls of the second workpiece, and the friction stir weld is a butt weld between the first workpiece and the second workpiece.

In other variations the joining end of the first workpiece is positioned within the interior portion of the second workpiece such that a lap joint is formed between the first workpiece and the second workpiece, the insert abuts the opposed interior walls of the first workpiece, and the friction stir weld is a lap weld bonding the first workpiece to the second workpiece.

In still another from of the present disclosure, a friction stir welded assembly is formed by a method that includes positioning an insert within an interior portion of a first workpiece and an interior portion of a second workpiece and friction stir welding the first workpiece to the second workpiece. The first workpiece has opposed interior walls defining the interior portion of the first workpiece, the second workpiece has opposed interior walls defining the interior portion of the second workpiece, and the insert extends between and abuts at least one of the opposed interior walls of the first workpiece and the opposed interior walls of the second workpiece. The insert provides support to the opposed interior walls of the first workpiece and the opposed interior walls of the second workpiece during the friction stir welding.

In some variations a joining end of the first workpiece is positioned within the interior portion of the second workpiece such that a lap joint is formed between the first workpiece and the second workpiece, and friction stir welding the first workpiece to the second workpiece forms a lap weld between the first workpiece and the second workpiece.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
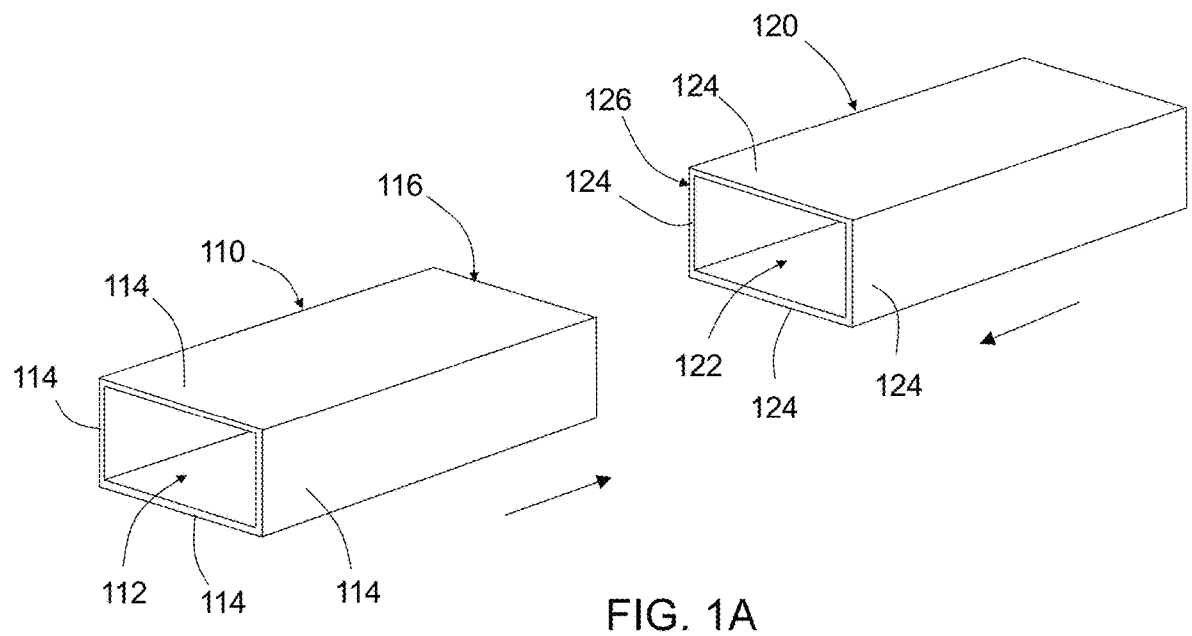
FIG. 1A shows a perspective view of two closed cell structures.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
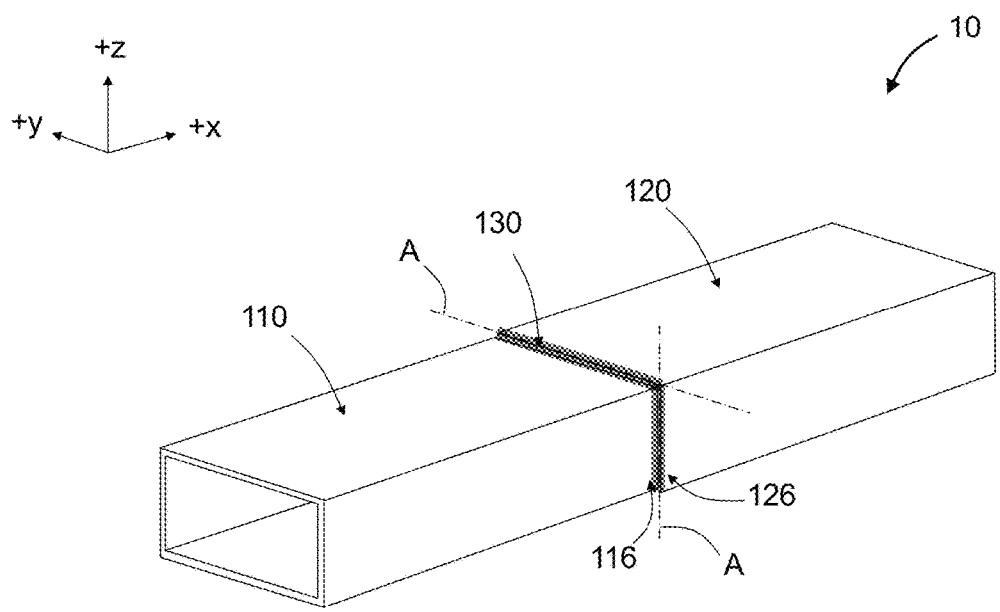
FIG. 1B shows the two closed cell structures in FIG. 1A joined together with a weld.

Referring to FIGS. 1A and 1B, a first closed cell structure 110 and a second closed cell structure 120 before being joined (welded) together (FIG. 1A) and after being joined together (FIG. 1B) are shown. As used herein, the phrase "closed cell structure" refers to a structure that defines or encloses an interior portion such that access to the interior portion is limited. Non-limiting examples of closed cell structures include cast or wrought (e.g., extruded) circular piping or tubing, rectangular piping or tubing, hexagonal piping or tubing, and any of such piping or piping with internal webs that divide the closed cell structures into two or more separate sub-cells, among others. The first closed cell structure 110 has opposed interior walls 114 defining an interior portion 112 and a joining end 116. Similarly, the second closed cell structure 120 has opposed interior walls 124 defining an interior portion 122 and a joining end 126. The joining end 116 of the first closed cell structure 110 and the joining end 126 of the second closed cell structure 120 are joined together with a weld 130 that extends along a weld axis A as shown in FIG. 1B.

Figure 2A:
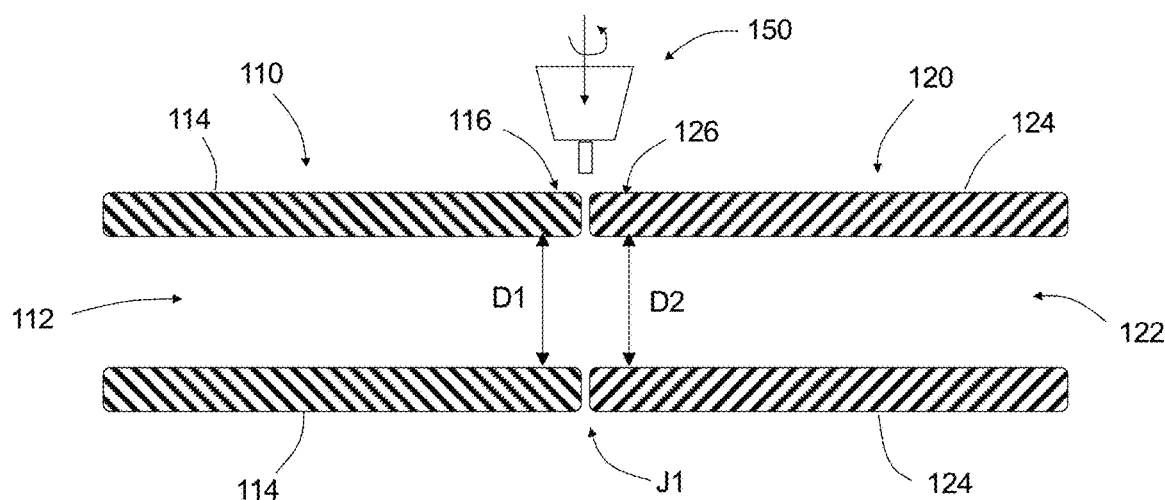
FIG. 2A shows a cross-section of the two closed cell structures in FIG. 1A forming a butt joint before being friction stir welded together.
Figure 2B:
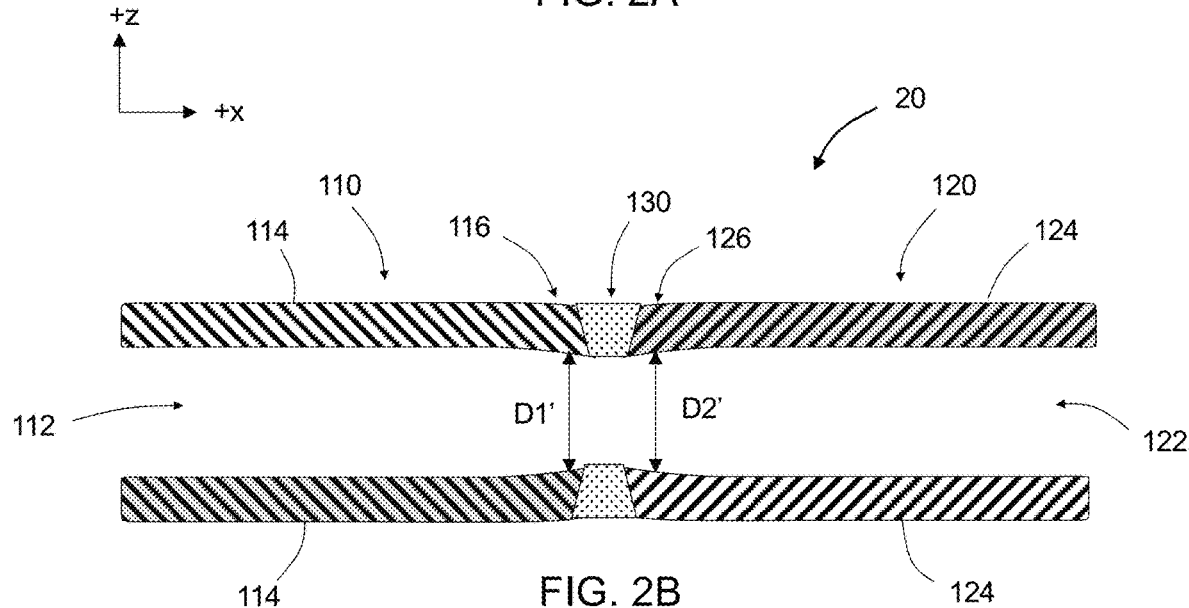
FIG. 2B shows a cross-section of the two closed cell structures in FIG. 2A with a friction stir weld formed at the butt joint.

Referring now to FIGS. 2A and 2B, an example of FSW the first and second closed cell structures 110, 120 together without using an insert or support is shown. In FIG. 2A the joining ends 116, 126 are positioned to form a butt joint J1 between the first and second closed cell structures 110, 120. The distance between the opposed interior walls 114 of the first closed cell structure 110 is D1 and the distance between the opposed interior walls 124 of the second closed cell structure 120 is D2. In some variations of the present disclosure the distance D1 is equal to the distance D2 (i.e., D1=D2), while in other variations the distance D1 is not equal to the distance D2 (i.e., D1≠D2).

In FIG. 2B the rotating tool 150 (FIG. 2A) has formed the weld 130 via FSW. It should be understood that the rotating tool 150 is inserted into the butt joint J1 and moved along the weld axis A (FIG. 1B) such that frictional heat is generated at the butt joint J1 and the weld 130 is formed between the first and second closed cell structures 110, 120. However, the high contact load, i.e., a downward (−z direction) force between the rotating tool 150 and the joining ends 116, 126, needed for FSW results in movement and/or deformation of the joining end 116 and/or joining end 126 during the FSW process. Accordingly, forming of the weld 130 between the joining ends 116, 126 via FSW without support between the opposed interior walls 114, 124 results in the plastic deformation at or near the joining ends 116, 126. That is, the distance between the opposed interior walls 114 of the first closed cell structure 110 is D1' which is less than D1 (i.e., D1'<D1) and the distance between the opposed interior walls 124 of the second closed cell structure 120 is D2' which is less than D2 (i.e., D2'<D2). It should be understood that in addition to plastic deformation at or near the joining ends 116, 126, such movement of the joining ends 116, 126 can affect the formation of the weld 130 such that less than desired properties (e.g., strength, ductility, profile shape, among others) are obtained or produced between the first and second closed cell structures 110, 120.

Figure 3A:
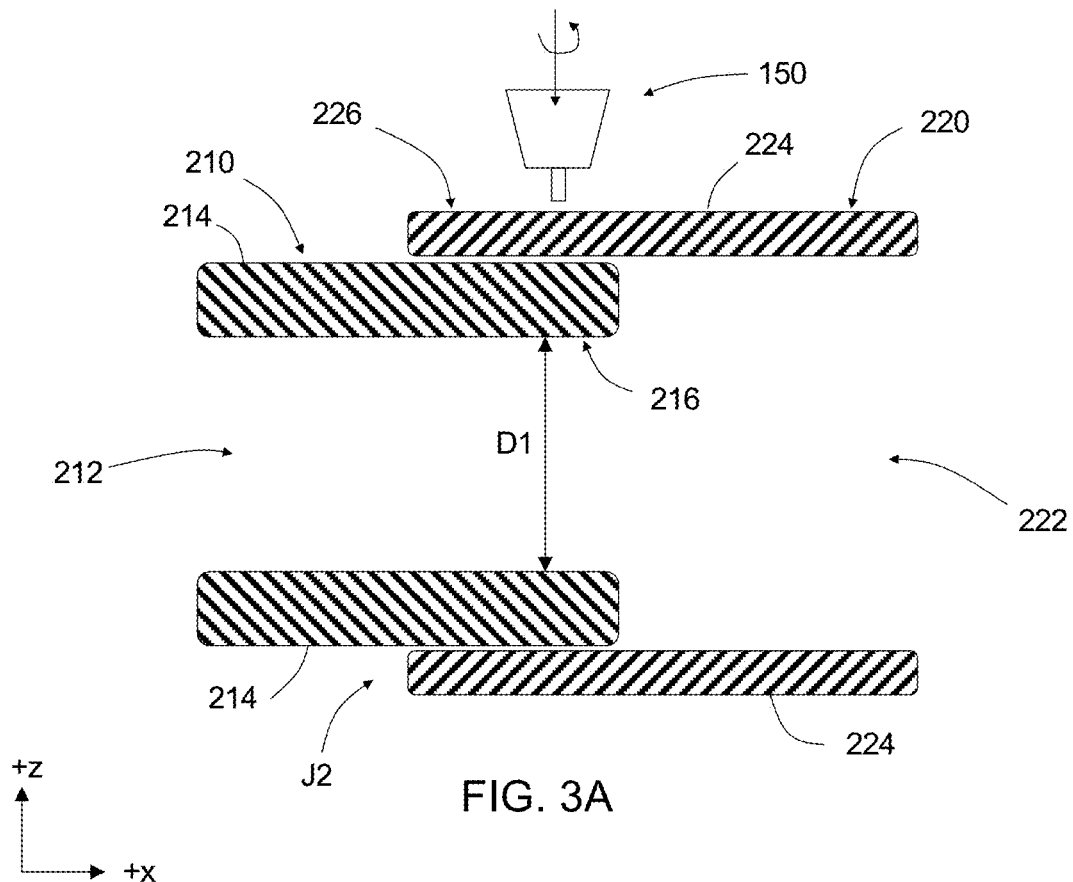
FIG. 3A shows a cross-section of two closed cell structures forming a lap joint before being friction stir welded together.
Figure 3B:
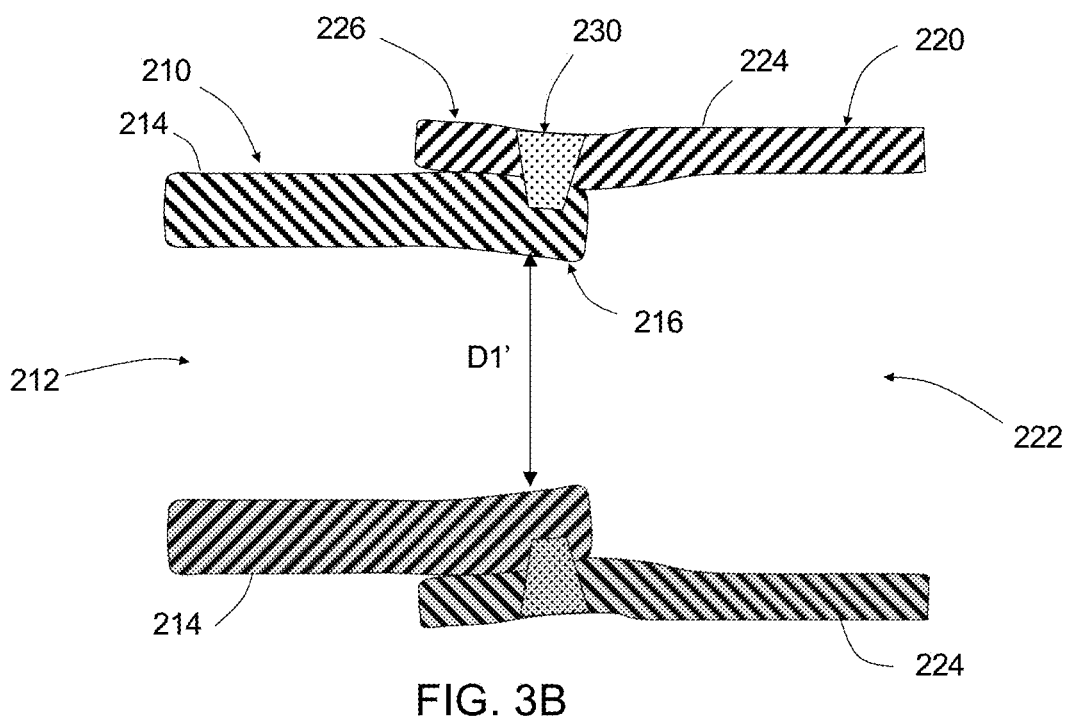
FIG. 3B shows a cross-section of the two closed cell structures in FIG. 3A with a friction stir weld formed at the lap joint.

Referring now to FIGS. 3A and 3B, another example of FSW welding a first closed cell structure 210 to a second closed structure 220 without using an insert or support is shown. The first closed cell structure 210 has opposed interior walls 214 defining an interior portion 212 and a joining end 216. Similarly, the second closed cell structure 220 has opposed interior walls 224 defining an interior portion 222 and a joining end 226. In FIG. 3A the joining ends 216, 226 form a lap joint J2 between the first and second closed cell structures 210, 220 with the joining end 226 of the second closed cell structure overlapping the joining end 216 of the first closed cell structure 210. The distance between the opposed interior walls 214 of the first closed cell structure 210 is D1.

In FIG. 3B the rotating tool 150 (FIG. 3A) has formed a weld 230 via FSW. It should be understood that the rotating tool 150 is inserted into joining end 226 and moved along a weld axis (not shown) such that frictional heat is generated at the lap joint J2 and the weld 230 is formed between the first and second closed cell structures 210, 220. In some variations the rotating tool 150 extends into the joining end 216 to form the weld 230. In other variations the rotating tool 150 does not extend into the joining end 216 and the frictional heat generated by the rotating tool 150 results in the weld 230 bonding (welding) the joining end 226 to the joining end 216 as shown in FIG. 3B. However, and similar to forming of the weld 130 in FIG. 2B, forming the weld 230 without support between the opposed interior walls 214 results in movement and/or deformation of the joining end 216 and/or joining end 226 during the FSW process. For example, the distance between the opposed interior walls 214 of the first closed cell structure 110 is D1' which is less than D1 (i.e., D1'<D1). It should be understood that in addition to plastic deformation at or near the joining ends 216, 226, such movement can affect the formation of the weld 230 such that less than desired properties (e.g., strength, ductility, profile shape, among others) are obtained or produced between the first and second closed cell structures 210, 220.

Figure 4A:
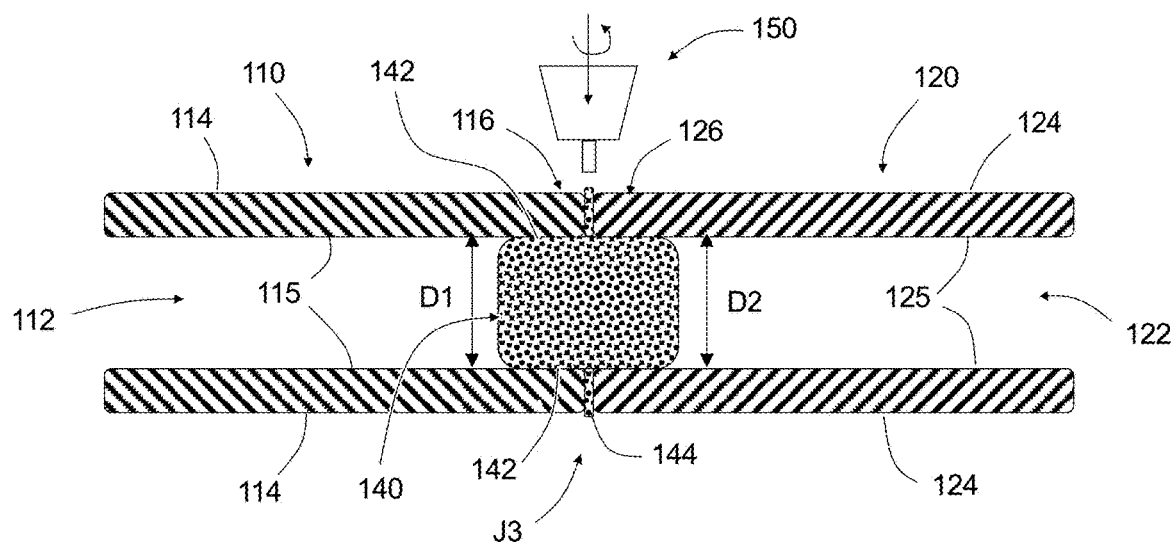
FIG. 4A shows a cross-section of the butt joint in FIG. 2A with an insert according to one form of the present disclosure.
Figure 4B:
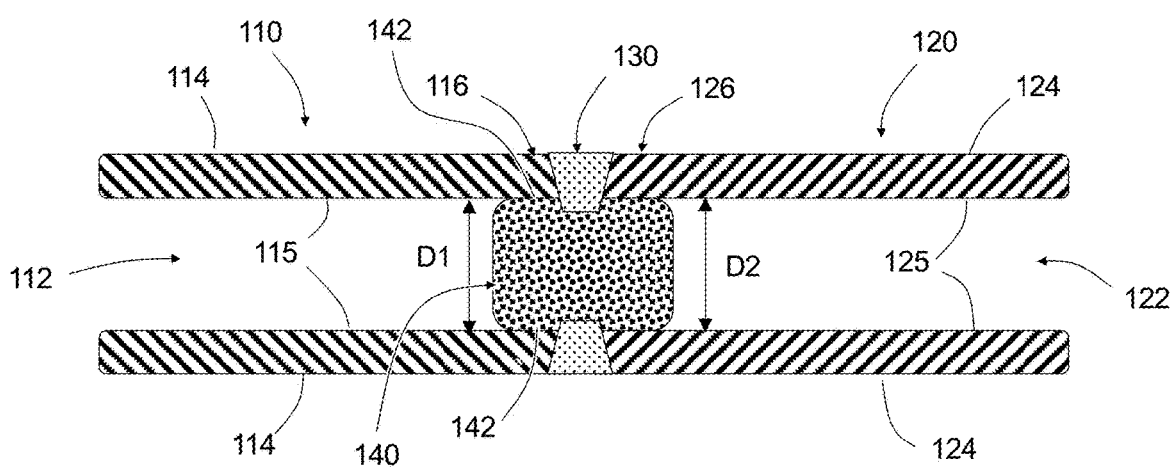
FIG. 4B shows a cross-section of a friction stir weld at the butt joint in FIG. 4A according to the teachings of the present disclosure.

Referring now to FIGS. 4A and 4B, an example of FSW welding the first and second closed cell structures 110, 120 together using an insert according to the teachings of the present disclosure is shown. In FIG. 4A, and similar to the example shown in FIG. 2A, the joining ends 116, 126 form a butt joint J3 between the first and second closed cell structures 110, 120 and the distance between the opposed interior walls 114 of the first closed cell structure 110 is D1 and the distance between the opposed interior walls 124 of the second closed cell structure 120 is D2. However, in the example shown in FIG. 4A an insert 140 with outer surfaces 142 that have a distance there between approximately equal to D1 and D2 is positioned within the joining ends 116, 126 of the first and second closed cell structures 110, 120, respectively. Accordingly, support between the opposed interior walls 114, 124 during FSW is provided and plastic deformation of the joining ends 116, 126 is reduced or does not occur as shown in the friction stir welded assembly depicted in FIG. 4B. That is, the insert 140 provides support against the high contact load between the rotating tool 150 and the joining ends 116, 126 during formation of the weld 130 such that the distance between the opposed interior walls 116 is D1 and the distance between the opposed interior walls 126 is D2 after the weld 130 is formed.

In some variations the weld 130 joins the insert 140 to the first closed cell structure 110 and/or the second closed cell structure 120 as shown in FIG. 4B. In other variations the insert 140 provides support between the opposed interior walls 114, 124 during FSW but the weld 130 does not join the insert 140 to the first closed cell structure 110 and/or the second closed cell structure 120. Also, in some variations the insert 140 can include one or more tabs 144 that extend between the joining ends 116, 126 (i.e., between the butt joint J3) and the tabs can be incorporated in the weld 130 during the FSW. It should be understood that the tabs 144 can assist in positioning and/or holding the insert 140 between the joining ends 116, 126 before and/or during FSW.

Figure 5A:
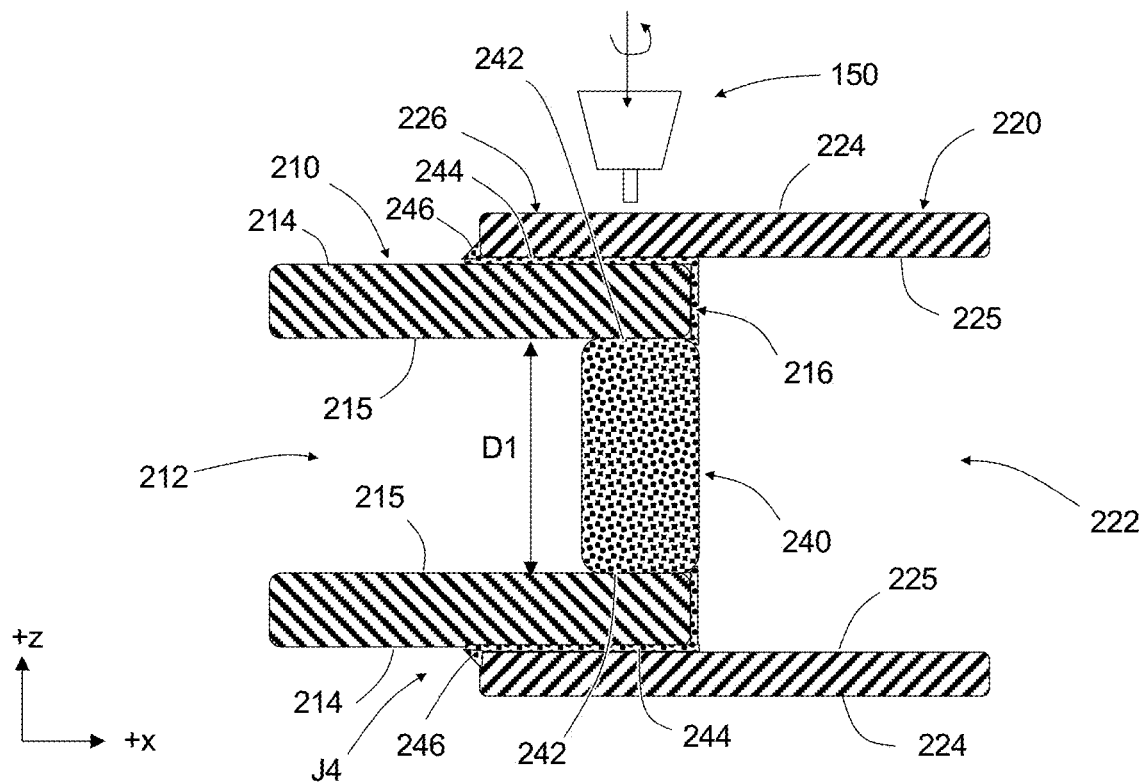
FIG. 5A shows a cross-section of the lap joint in FIG. 3A with an insert according another form of the present disclosure.
Figure 5B:
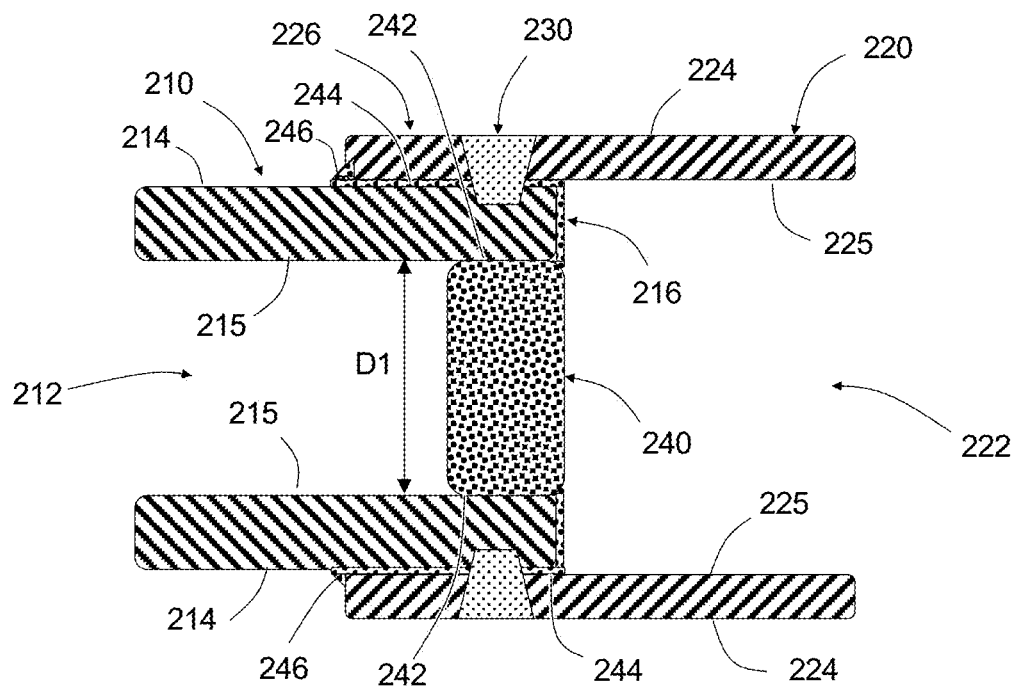
FIG. 5B shows a cross-section of a friction stir weld at the lap joint in FIG. 5A according to the teachings of the present disclosure.

Referring now to FIGS. 5A and 5B, an example of FSW welding the first and second closed cell structures 210, 220 together using an insert according to the teachings of the present disclosure is shown. In FIG. 5A, and similar to the example shown in FIG. 3A, the joining ends 216, 226 form a lap joint J4 between the first and second closed cell structure 210, 220 and the distance between the opposed interior walls 214 of the first closed cell structure 110 is D1. However, in the example shown in FIG. 5A an insert 240 with outer surfaces 242 that have a distance there between approximately equal to D1 is positioned within the joining end 216. It should be understood that the insert 240 is also positioned within the joining end 226 that overlaps the joining end 216. Accordingly, support between the opposed interior walls 214, 224 during FSW is provided and plastic deformation of the joining ends 216, 226 is reduced or does not occur as shown in the friction stir welded assembly depicted in FIG. 5B. That is, the insert 240 provides support against the high contact load between the rotating tool 150 and the joining ends 216, 226 during formation of the weld 230 such that the distance between the opposed interior walls 216 is D1 after the weld 230 is formed.

In some variations the weld 230 joins the insert 240 to the first closed cell structure 210 and/or the second closed cell structure 220 as shown in FIG. 5B. In other variations the insert 240 provides support between the opposed interior walls 214, 224 during FSW but the weld 230 does not join the insert 240 to the first closed cell structure 210 and/or the second closed cell structure 220.

In some variations the insert 240 can include one or more tabs 244 that extend between the joining ends 216, 226 (i.e., between the lap join J4) and the tabs can be incorporated in the weld 230 during the FSW. It should be understood that the tabs 244 can assist in positioning and/or holding the insert 240 between the joining ends 216, 226 before and/or during FSW. For example, the tabs 244 can include an end 246 that assists in positioning and/or aligning the insert 240 within the interior portion 212 of the first closed cell structure 220. In some variations the tabs 244 slide over a joining end of one of the closed cell structures and the ends 246 abut against an end (not labeled) of the other closed cell structure such that the insert 240 is positioned at a desired location during FSW of the closed cell structures together. In the example shown in FIGS. 5A and 5B, the tabs 244 slide over the joining end 216 of the first closed cell structure 210 and the ends 246 abut against an end (not labeled) of the second closed cell structure 220 such that the insert 240 is positioned at a desired location during FSW of the second closed cell structure 220 to the first closed cell structure 210.

Figure 6A:
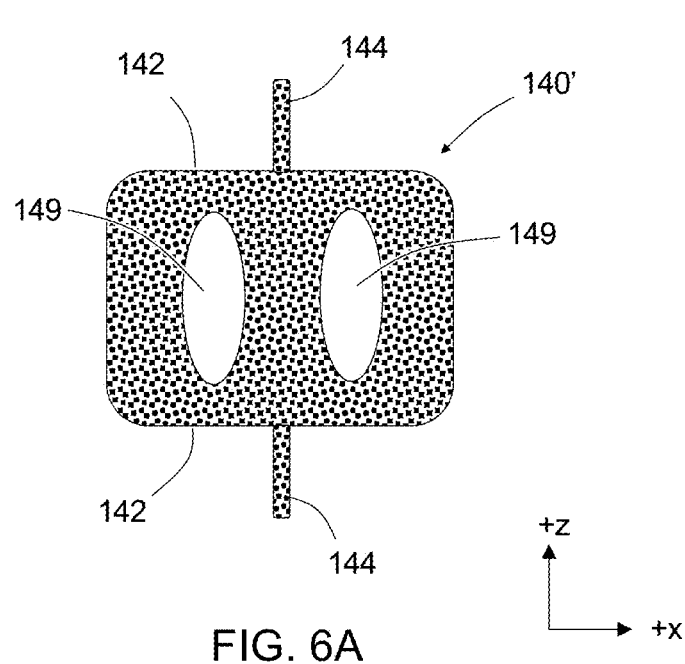
FIG. 6A shows a cross-section of an insert for FSW according to one form of the present disclosure.
Figure 6B:
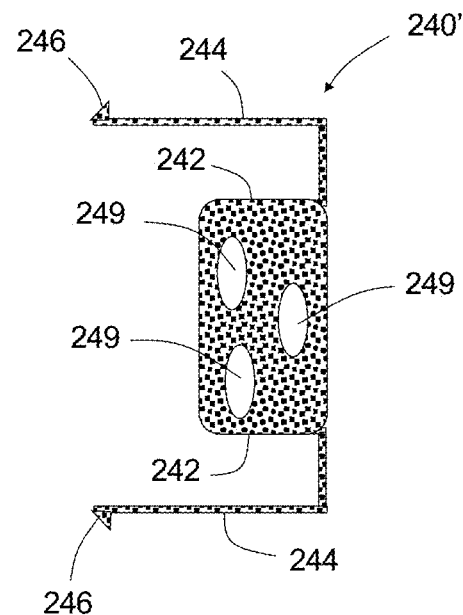
FIG. 6B shows a cross-section of another insert for FSW according to another form of the present disclosure.

While the inserts 140 and 240 are shown as being solid inserts, in some variations of the present disclosure the inserts have interior cavities as shown in FIGS. 6A and 6B. For example, an insert 140' includes one or more interior cavities 149 and an insert 240' includes one or more interior cavities 249. It should be understood that the inserts 140' and 240' still provide support between the opposed interior walls 114, 124 and the opposed interior walls 214, 224, respectively, while reducing the mass and weight of the inserts 140, 240.

Figure 7:
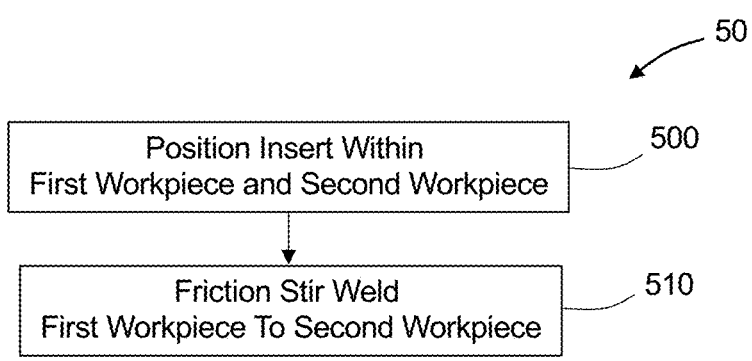
FIG. 7 is a flow chart for a method of FSW two close cell structure work pieces together according to the teachings of the present disclosure.

Referring now to FIG. 7, a method 50 of forming a friction stir welded assembly includes positioning an insert within a first workpiece and a second workpiece at 500 and FSW the first workpiece to the second workpiece at 510. In some variations the first and second workpieces are closed cell structures and the insert provides support between opposed interior walls of the first and second workpieces during FSW at 510.

It should be understood from the teachings of the present disclosure that a friction stir welded assembly containing or including closed cell structures joined to each other is provided. The joined closed cell structures have an insert between opposed interior walls of at least one of the closed cell structures such that the insert provides structural support to the closed cell structures during FSW. The insert can be joined to at least one of the closed cell structures during FSW such that the insert becomes part of the friction stir welded assembly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A friction stir welded assembly comprising:
a first workpiece having an interior portion with opposed interior walls;
a second workpiece having an interior portion with opposed interior walls;
an insert positioned within the interior portion of the first workpiece and the interior portion of the second workpiece, the insert extending between and abutting at least one of the opposed interior walls of the first workpiece and the opposed interior walls of the second workpiece; and
a friction stir weld between the first workpiece to the second workpiece extending around the respective interior portions of the first and second workpieces,
wherein the friction stir weld and the insert form a solid layer of material across the interior portions of the first and second workpieces, the solid layer of material closing the interior portion of the first workpiece from the interior portion of the second workpiece; and
wherein a joining end of the first workpiece is positioned within the interior portion of the second workpiece such that a lap joint is formed between the first workpiece and the second workpiece, and the friction stir weld is a friction stir lap weld between the first workpiece and the second workpiece.

2. The friction stir welded assembly according to claim 1, wherein the friction stir weld joins the insert to the first workpiece and the second workpiece.

3. The friction stir welded assembly according to claim 1, wherein the insert abuts the opposed interior walls of the first workpiece.

4. The friction stir welded assembly according to claim 1, wherein the insert has a tab extending between the lap joint formed between the first workpiece and the second workpiece.

5. The friction stir welded assembly according to claim 1, wherein the insert comprises a tab extending between a joining end of the first workpiece and a joining end of the second workpiece.

6. The friction stir welded assembly according to claim 5, wherein at least a portion of the tab is incorporated in the friction stir weld.

7. The friction stir welded assembly according to claim 1, wherein the insert is a solid insert extending between and abutting at least one of the opposed interior walls of the first workpiece and the opposed interior walls of the second workpiece.

8. The friction stir welded assembly according to claim 1, wherein the insert has interior cavities between surfaces abutting at least one of the opposed interior walls of the first workpiece and the opposed interior walls of the second workpiece.

9. The friction stir welded assembly according to claim 1, wherein the first workpiece is cast aluminum workpiece and the second workpiece is a wrought aluminum workpiece.

10. The friction stir welded assembly according to claim 1, wherein the wrought aluminum workpiece is an extruded aluminum workpiece.

11. The friction stir welded assembly according to claim 1, wherein the insert is an aluminum insert.

12. A friction stir welded assembly comprising:
a first workpiece having an interior portion with opposed interior walls and a joining end;
a second workpiece having an interior portion with opposed interior walls and a joining end;
an insert positioned within the interior portion of the first workpiece and the interior portion of the second workpiece, the insert extending between and abutting at least one of the opposed interior walls of the first workpiece and the opposed interior walls of the second workpiece; and
a friction stir weld between the first workpiece and the second workpiece extending around the respective interior portions of the first and second workpieces, wherein the friction stir weld bonds the first workpiece, the second workpiece and the insert together,
wherein the friction stir weld and the insert form a solid layer of material across the interior portions of the first and second workpieces, the solid layer of material closing the interior portion of the first workpiece from the interior portion of the second workpiece; and
wherein the joining end of the first workpiece is positioned within the interior portion of the second workpiece such that a lap joint is formed between the first workpiece and the second workpiece, the insert abuts the opposed interior walls of the first workpiece, and the friction stir weld is a friction stir lap weld bonding the first workpiece to the second workpiece.

13. A friction stir welded assembly formed by a method comprising:
positioning an insert within an interior portion of a first workpiece and an interior portion of a second workpiece, wherein the first workpiece comprises opposed interior walls defining the interior portion of the first workpiece, the second workpiece comprises opposed interior walls defining the interior portion of the second workpiece, and the insert extends between and abuts at least one of the opposed interior walls of the first workpiece and the opposed interior walls of the second workpiece; and
friction stir welding the first workpiece to the second work piece to form a friction stir weld extending around the respective interior portions of the first and second workpieces, wherein the insert provides support to the opposed interior walls of the first workpiece and the opposed interior walls of the second workpiece during the friction stir welding,
wherein the friction stir weld and the insert form a solid layer of material across the interior portions of the first and second workpieces, the solid layer of material closing the interior portion of the first workpiece from the interior portion of the second workpiece; and
wherein a joining end of the first workpiece is positioned within the interior portion of the second workpiece and such that a lap joint is formed between the first workpiece and the second workpiece, and the friction stir welding the first workpiece to the second workpiece forms a friction stir lap weld between the first workpiece and the second workpiece.

* * * * *